S. H. Shaw,
Feed Rack.
No. 102,874. Patented May 10, 1870.
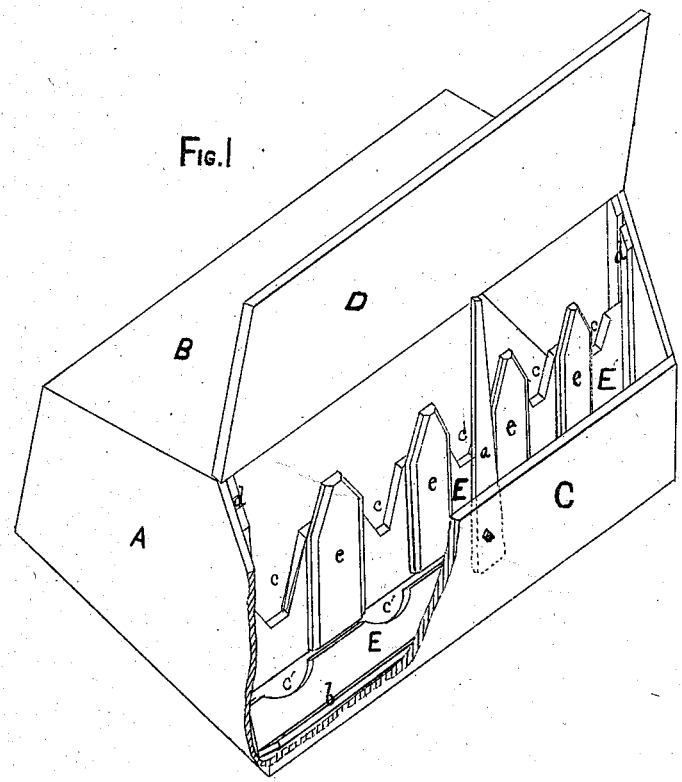
Fig. I.
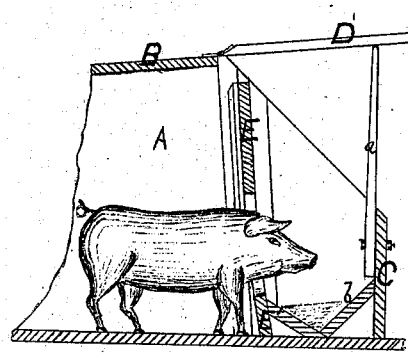
Fig. III.
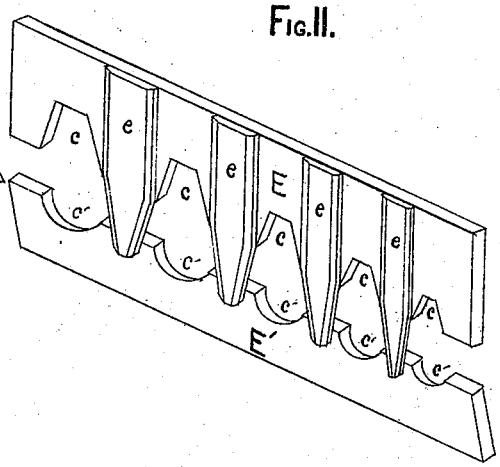
Fig. II.
WITNESSES.
J. R. Drall
M. Woodward.
S. H. Shaw INVENTOR.
by
J. Fraser & Co.
Attys

United States Patent Office.

SPICER H. SHAW, OF ATTICA, NEW YORK.

Letters Patent No. 102,874, dated May 10, 1870

IMPROVEMENT IN STALLS FOR FEEDING ANIMALS.

The Schedule referred to in these Letters Patent and making part of the same.

To all whom it may concern:

Be it known that I, SPICER H. SHAW, of Attica, in the county of Wyoming and State of New York, have invented certain new and useful Improvements in Stock-Feeders, of which the following is a specification, reference being had to the accompanying drawings.

Nature of Invention.

My invention consists in the construction and arrangement of a sectional rack capable of adjustment vertically, to graduate the openings to animals of different size, or of reversal, to accommodate to a different kind of feeding, as hereinafter described.

General Description.

In the drawings—

Figure 1 is a perspective view of my whole device, with trough or feed-cover raised;

Figure 2, a similar view of the extension-rack detached; and

Figure 3, a cross-section of the whole.

A A are the two sides of the pen or shed;

B, the top;

C, the trough end; and

D, the cover, raised in fig. 1, and held up by a rod, a, while feed is being put into trough b, but closed afterward to keep out snow, rain, &c.

The rod a turns inside the end C, to which it is pivoted when the cover is shut.

E is the upper section of the feed-rack, having graduated holes or notches c c c, of suitable shape, cut in its lower edge, at intervals, to receive the heads of the animals to be fed.

The lower section of the rack E has corresponding holes c' c' formed in its upper edge, to meet corresponding openings c c of the upper section.

This lower part E' is stationary, but the upper part works up or down in grooves d d at each side. This is for the purpose of enlarging the openings for the stock, according to the size of the animals.

When pigs or sheep are small, the rack remains with its upper and lower sections meeting, the very small pigs going into the smallest holes which the larger and more "hoggish" cannot enter. When, however, the stock grows in size and larger openings are required, the upper rack E is raised or slid up in the grooves d d to the desired height, and then held by pins.

As the animals grow, the openings are enlarged by raising the rack higher. To further insure this result, and to close the long space left between the sections and feed-openings when the upper part is raised, I fasten onto the upper rack, and between the holes, slats or bars e e, with pointed ends, which project downward and keep the animals from getting into each others places, or from "slashing" each other, or from fighting over their feed. This arrangement of the rack is shown in figs. 2 and 3.

An important feature, also, of this rack and feeder is, that it can be used for large cattle as well as hogs and sheep, an effect, I believe, never before produced. This is accomplished by simply reversing the rack E, the slats e e then standing up with the openings between to allow each animal to get his own feed; as, for instance, corn, which is put in above the trough from the outside, and the cover D kept open or shut, as desired. This arrangement is clearly shown in fig. 1.

My rack can be attached to any stationary or movable pin, and will be found very useful in all; and, if necessary, it could be made in two or more sections, some having small and some larger holes.

An advantage of this rack is that it stands slanting or "raking" forward, so that it effectually prevents hogs from rearing against it, for if they do they will inevitably fall or slip down.

If desired, the trough can be divided, so that each pig can get just what is put in opposite each opening, thus preventing a larger or stronger from getting the feed of a smaller or weaker animal.

The advantages of this arrangement consist in the combination and arrangement of the rack, whereby the same is not only made adjustable vertically in one position to admit the entrance of the heads of small animals of varying sizes, but is also capable of reversal, so that the division slats between the feed-holes stand upward, to allow the feeding of animals of a larger size. This difference in the position and arrangement of the rack is shown in figs. 1 and 2. This effect is owing to making the upper section of the rack adjustable and movable from place.

I am aware that a feeder has before been employed in which different-sized holes have been used to admit the heads of different-sized animals, but in such cases there has been no graduation or adjustment of the size, nor any reversal of the rack. These features I believe to be new.

Claim.

What I claim as my invention, and desire to secure by Letters Patent, is—

The construction and arrangement of the rack as herein described, the lower part being stationary, and the upper part adjustable and reversible in position, substantially as set forth.

In witness whereof I have hereunto signed my name in the presence of two subscribing witnesses.

S. H. SHAW.

Witnesses:
J. R. DRAKE,
C. N. WOODWARD.